United States Patent [19]

Hetz

[11] 4,078,582

[45] Mar. 14, 1978

[54] TWO-STAGE CONTROL VALVE

[75] Inventor: Heinz K. Hetz, Holicong, Pa.

[73] Assignee: Yarway Corporation, Blue Bell, Pa.

[21] Appl. No.: 677,230

[22] Filed: Apr. 15, 1976

Related U.S. Application Data

[63] Continuation-in-part of Ser. No. 511,808, Oct. 3, 1974, abandoned.

[51] Int. Cl.² ............................................. F16K 1/54
[52] U.S. Cl. ............................... 137/630.14; 251/121; 251/127
[58] Field of Search ...................... 137/630.14, 630.15, 137/630.22, 614.16, 495, 630.13

[56] References Cited

U.S. PATENT DOCUMENTS 3,624,753  11/1971  Brumm ........................... 137/630.14

Primary Examiner—Robert G. Nilson
Attorney, Agent, or Firm—John W. Logan, Jr.

[57] ABSTRACT

The preferred embodiments of the invention disclosed herein comprise a first or main control valve means and a second valve means including a pressure reducing valve arrangement both controlled by the same actuator means. Initial operation of the actuator means opens the second valve means and its further operation opens the first valve means. The valve means are constructed and arranged so that inlet pressure provides a force tending to close the first valve means and another force which tends to open the second valve means whereby proper sequential operation of the valves is assured and so that the force acting to open the second valve is transmitted to the first valve when it is being opened.

22 Claims, 6 Drawing Figures

TWO-STAGE CONTROL VALVE

This application is a continuation-in-part of application Ser. No. 511,808 filed on Oct. 3,1974 for Two-Stage Control Valve, now abandoned.

This invention relates generally to valves and, more specifically, to two-stage sequentially operated valves for controlling the flow of fluid in applications having two different flow requirements.

The invention disclosed herein has application in the control of fluid flow where the initial flow requirement includes a high pressure differential and wherein a later flow requirement includes a significantly lower pressure differential. Applications of this type include controlling the flow of feed water from the feed water pumps to the steam generator of a generating system, particularly, a reactor powered generating system. From the startup condition to about 15% of full load, a high pressure differential exists between the feed water pumps and the steam generator so that a small valve including a pressure reducing arrangement should be used to control flow of the feed water; from about 15% of full load to full load, a significantly smaller pressure differential exists between the feed water pumps and the steam generator so that a larger or main control valve should be used.

In generating systems of the type noted above, it has been usual to provide a two-valve system between the feed water pumps and the steam generator. One valve in the system is relatively large and functions as the main control valve while the other valve is smaller, includes a pressure-reducing arrangement and is connected in parallel to the main valve. The feed water initially flows through the smaller valve including the pressure-reducing arrangement until the generator is operating at about 15% of full load at which time the main valve is opened.

The two-valve system described above is a somewhat complex arrangement requiring extra piping, connections, and, of course, an extra valve. Accordingly, the cost of the system is somewhat expensive, particularly in view of the added labor costs required for the installation of the extra apparatus.

An alternative to the two-valve system described above would involve the use of a single two-stage sequentially operated valve assembly including a main control valve and a secondary control valve of the type noted above. Various valve assemblies of this type are known in the prior art, but are not considered entirely satisfactory. For example, most of the known valve assemblies of this type utilized mechanical arrangements to provide for the sequential opening and closing of the main and secondary control valves. Because of the nature of these mechanical arrangements, malfunctions can occur such that the valves would not operate in their proper sequence. Also, in applications where fluid under high pressure is present on the inlet side of the valve assembly prior to opening of the valves, another problem has been noted. In known two-stage valve assemblies, the fluid pressure acts on either one or both of the valves developing high forces that must be overcome when the valves are opened. Thus, actuating mechanisms developing high forces must be utilized, adding to the expense of the valve assemblies.

Still another problem presented by a known two-stage valve assemblies results from the usual arrangement in which both the main and secondary control valves can be open simultaneously. At lower flow conditions, particularly after the main control valve has just opened, most of the flow is through the secondary control valve and only a relatively small flow is through the main control valve. At these relatively low flow conditions the main control valve operates with a low degree of accuracy and is subject to wire drawing. In addition, the valve seat forming part of the main control valve can sustain structural damage.

It is an object of this invention, therefore to provide a two-stage sequential valve assembly and constructed so that its proper sequential operation is assured.

It is still another object of this invention to provide a two-stage sequential valve assembly arranged and constructed so that excessively high forces are not required to open the valves.

It is yet another object of this invention to provide a two-stage sequential valve assembly arranged and constructed so that fluid pressure acts to assure the proper sequential operation of the valves and require minimal actuation forces.

It is yet another object of this invention to provide a two-stage sequential valve assembly including a main control valve and a secondary valve arranged and constructed so that after the main control valve opens the flow of fluid is transferred from the secondary control valve to the main control valve.

Finally, it is an object of this invention to provide a two-stage sequential valve assembly that is relatively simple, easy to install and inexpensive.

These and other objects of the invention are realized by providing a two-stage sequentially operated valve assembly including an inlet port and an outlet port and first and second valve means each controlling the flow of fluid from the inlet port to the outlet port. The first valve includes a portion in communication with the inlet port whereby inlet pressure acts on that portion when the valve is closed to assure that the valve remains closed. The second valve also includes a portion in communication with the inlet port whereby the inlet pressure acts on that portion to exert a force tending to open the second valve when it is in its closed position. The configuration of the second valve is such that the force tending to open the second valve is either not offset by any other fluid pressure force or is balanced by any such other forces. An actuator mechanism is operatively associated with the valves and functions to initially open the second valve and thereafter open the first valve. Because of the communication between the valves and the inlet port, proper sequential operation of the valves is assured and because of the arrangement of the actuator mechanism and the valves, the forces required to actuate the valves are minimized.

More particularly, the first valve functions as the main control valve and has one face that cooperates with a valve seat to control the flow of fluid and another face in communication with the inlet port and on which the inlet pressure acts. The second valve includes a pressure-reducing arrangement and also includes a face that cooperates with a valve seat to control the flow of fluid. Another face of the second valve bears on a surface of a piston member carried by the actuating mechanism and that surface is in communication with the inlet port so that inlet pressure acts thereon. Operation of the actuator mechanism initially opens the second valve and moves the piston member. Thereafter as the piston member continues to move the first valve is opened.

In one preferred embodiment of the invention a flow control arrangement is provided between the inlet port and the second valve for allowing the flow of fluid from the inlet port to the second valve when the first valve is closed and for discontinuing the flow of fluid from the inlet port to the second valve after the first valve has opened. With the described flow control arrangement the fluid initially flows from the inlet port to the second valve is discontinued and all of the flow is transferred to the first valve.

For a better understanding of the invention, reference is made to the following description of a preferred embodiment, taken in conjunction with the FIGS. of the accompanying drawing in which.

Figure 1:
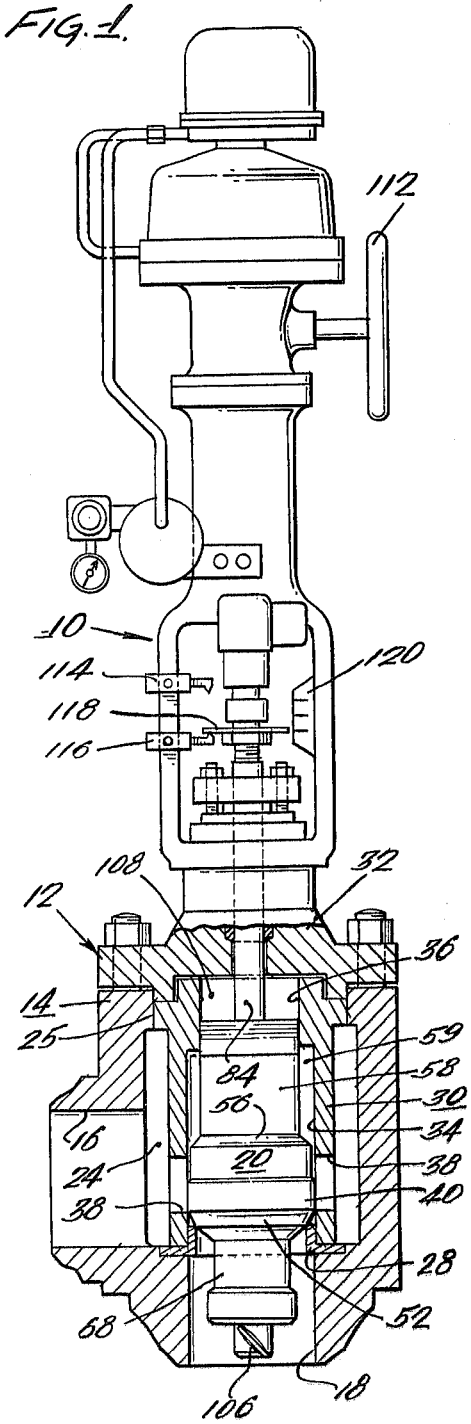
FIG. 1 is a partial section view of a two-stage sequentially operated valve assembly in accordance with one embodiment of this invention.

Referring now to FIGS. 1-4 of the drawings, there is shown one preferred embodiment of a two-stage sequentially operated valve assembly in accordance with this invention including an actuating assembly 10 and a valve assembly 12. Actuating assembly 10 could be of any suitable type, either manually, mechanically, electrically or hydraulically controlled and will be described in somewhat more detail hereinafter. Valve assembly 12 includes a generally cylindrical housing 14 having a radially disposed inlet port 16 formed through its side wall and an axially disposed outlet port 18 formed by the lower end of a central bore extending longitudinally through the housing. As used herein the terms "upper and lower" refer only to the orientation of the valve assembly in the drawings to simplify the description in the specification, but it should be understood that other orientations of the valve assembly are possible and that these terms are not used by way of limitation. Between ports 16 and 18 is a first control valve 20 and a second control valve 22 each operatively connected to actuating assembly 10 for controlling the flow of fluid between the ports as will be explained hereinafter.

Formed in the bore in housing 14 and radially adjacent inlet port 16 is an annular flow chamber 24 which extends from the upper end of outlet port 18 to an internal flange 25 formed adjacent the upper end of housing 14. At the juncture of the outlet port 18 and flow chamber 24 is formed an annular shoulder 26 in which is located a valve seat 28 forming part of first control valve 20 and which is clamped in place by the lower end of a generally cylindrical guide sleeve 30 and a mounting bonnet 32 on which actuator assembly 10 is carried. Guide sleeve 30 is formed with a stepped bore including a large diameter bore 34 and a reduced diameter bore 36. Spaced adjacent the lower end of guide sleeve 30 and above valve seat 28 are a series of cross ports 38 that communicate between flow chamber 24 and the large diameter bore 34 for reasons to become clearer hereinafter.

Slidably carried in guide sleeve 30 is a main valve disc 40 having a generally outer cylindrical portion 42 formed with a series of cross ports 44 and an annular flow chamber 46 both of which communicate with cross ports 38. The diameter of cylindrical portion 42 is slightly less than that of bore 34 of guide sleeve 30 so that a flow passage 48 is formed between cross ports 38 and bore 34. However, the diameter of cylindrical portion 42 below cross ports 44 is enlarged to have a sliding fit with bore 34 of guide sleeve 30 and this can be suitably provided by use of an appropriate liner 50. Extending from the lower end of cylindrical portion 42 are first and second frustoconic surfaces 52 and 54, respectively, and liner 50 also extends over these surfaces. First surface 52 cooperates with valve seat 28 to form the first or main control valve 20 between ports 16 and 18.

At the upper end of cylindrical portion 42 is formed another frusto-conical surface 56 which surface terminates at a cylindrical surface portion 58 having a diameter less than that of cylindrical 42 and slightly less than that of bore portion 36 in guide sleeve 30 so that cylindrical surface portion 58 has a sliding fit therein. With this arrangement, a pressure chamber 59 is formed between cylindrical surface portion 58 and bore 34 of guide sleeve 30 which is in communication with the inlet port 16 through flow passage 48, cross ports 38, and annular flow chamber 24. Thus, fluid pressure on the inlet side of valve assembly 12 acts on frusto-conic surface 56 developing a force acting to seat surface 52 on valve seat 28 keeping first valve 20 closed.

Extending longitudinally through main valve disc 40 is a central stepped bore including a first reduced diameter bore 60 terminating in a shoulder 62 adjacent the bottom of flow chamber 46. Above flow chamber 46 is an enlarged bore 63 which is internally threaded throughout a portion of its axial length and which cooperates with external threads formed on a guide sleeve 64 to secure the guide sleeve to the main valve disc. A set screw 66 can be used to lock the guide sleeve to the main valve disc. Cross-ports 65 are formed at the lower end of guide sleeve 64 and communicate with inlet port 16 through flow chamber 46, cross-ports 44 and 38 and flow chamber 24.

Seated on shoulder 62 and clamped thereto by the lower end of guide sleeve 64 is a radial flange 66 formed on the upper end of a generally cylindrical sleeve member 68 extending downwardly through bore 60 in main valve disc 40. The inner surface of sleeve member 68 is formed with a plurality of spaced land members 70 defining a plurality of fluid chambers 72 described herinafter. At the upper end of the inner surface of sleeve member 68 is formed a valve seat 74 which cooperates with a conical surface 76 to form second control valve 22. Conical surface 76 is formed on the lower end of a cylindrical member 78. When conical surface 76 seats on valve seat 74, of course, fluid flow between ports 16 and 18 is prevented.

Formed through the upper end face of cylindrical member 78 is a threaded bore 80 which cooperates with an externally threaded portion 82 of an actuating stem 84 which is formed with a thread 85 cooperating with a limiting jam nut arrangement 86, and which extends through the end face 88 of guide sleeve 64. If desired, an additional locking pin 90 can be used to secure actuating stem 84 to cylindrical member 78. Adjacent the externally threaded end of actuating stem 84 is carried a piston member 92, one face 94 of which seats on the end face of cylindrical member 78. Face 94 of piston member 92 communicates with a pressure chamber 95 formed by the inner surface of guide sleeve 64, cylindrical member 78 and valve 22 when closed. Thus fluid pressure on the inlet side of valve assembly 12 acts on piston face 94 developing a force tending to open second valve 22. Piston member 92 is slidably received in an enlarged diameter portion 96 of sleeve member 64 which terminates in a further reduced diameter portion 98 forming a stop shoulder 100. Normally, the adjustable jam nuts 86 will engage the lower face of the upper end wall sleeve 64 to limit movement of the stem 84 relative to the main valve disc 40. Further upward force on actuating stem 84 after the adjustable jam nut 86 engages the end face of the sleeve 64 will be transmitted to main valve disc 40 and cause it to move as will explained hereinafter.

Figure 2:
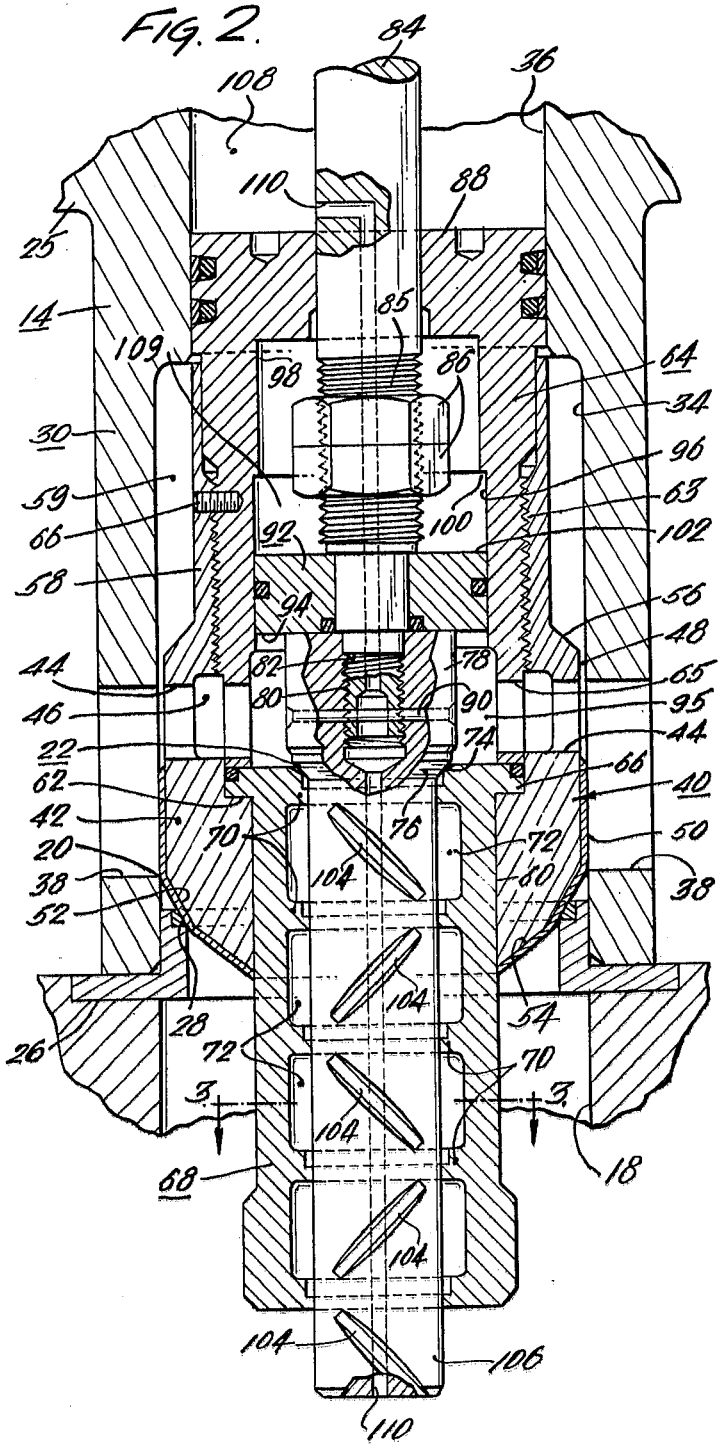
FIG. 2 is an enlarged section view of the valve portion of the valve assembly illustrated in FIG. 1.
Figure 4:
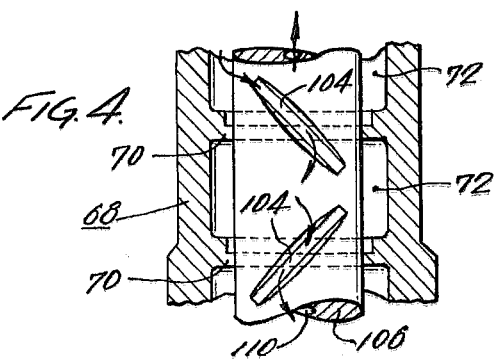
FIG. 4 is a view of the pressure reducing arrangement illustrated in FIG. 2 in its open position.
Figure 3:
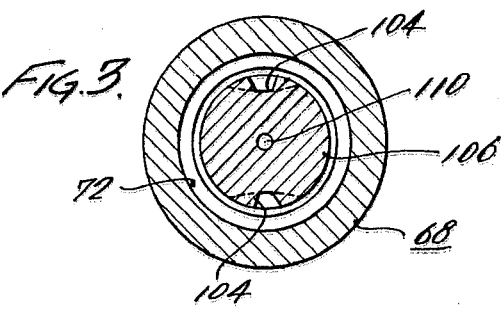
FIG. 3 is a section view taken along line 3—3 of FIG. 2.

In the preferred embodiment of the invention disclosed in FIGS. 1-3, valve 22 formed by valve seat 74 and valve member 76 is adapted to operate at a high pressure differential and includes a pressure reducing arrangement which can be of any suitable type. However, the particular type disclosed herein includes a series of inclined throttling recesses 104 formed on the outer surface of a valve shaft 106 carried by valve member 76 and extending downwardly through sleeve member 68. In the closed position of valve 22, recesses 104 extend between adjacent land members 70 and in the open position, extend between adjacent chambers 72 formed between the lands. Thus, as clearly shown by the arrows in FIG. 4 of the drawings, when valve 22 is open, fluid is throttled through recess 104 into the chambers 72 which act as decompression chambers reducing fluid pressure until the fluid is discharged through outlet port 18. For a more complete description of certain principles of operation of the pressure reducing arrangement disclosed herein, reference is made to U.S. Pat. No. 3,252,480 issued to Odendahl et al., on May 24, 1966, the disclosure of which is incorporated herein by reference.

As seen in FIG. 1 of the drawings, a chamber 108 is formed above end face 88 of guide sleeve 64 and the inner face of mounting bonnet 32 which could be filled by pressurized fluid due to leakage in the valve assembly. While it is noted that appropriate seals are provided, some leakage can occur. To relieve the pressure, a suitable relief passage 110 is formed through actuator stem 84, cylindrical member 78 and valve shaft 106. It is also noted that because of leakage, the chamber 109 formed between the top face of piston 92 and the lower face opposite face 88 of the guide sleeve 64 can accumulate fluid therein. As the valve 22 opens, the piston 92 which is moved upwardly by the actuating assembly 10 forces accumulated fluid in chamber 109 to flow out through the same leakage path through which is entered the chamber and between actuating stem 84 and the end wall of guide sleeve 64 where it is also discharged through relief passage 110. In some instances the presence of fluid in chamber 109 can have a beneficial effect. If pressure inlet forces tending to open valve 22 are sufficiently high, the valve 22 could override actuating assembly 10 causing jam nuts 86 to strike the upper end wall of chamber 99 with a relatively large force. Any fluid in chamber 109 provides a beneficial snubbing effect. Thus, opening of valves 20 and 22 is not prevented.

As noted previously, actuating assembly 10 can be of any suitable type. That illustrated in the drawing is pneumatically operated and is equipped with a manual override operable through use of a handwheel 112. Also associated with actuating assembly 10 is a suitable set of limit switches 114 and 116 which cooperate with a switch member 118 carried on actuator shaft 85 to shut off the motor driving the actuator shaft. In addition, switch member 114 can be associated with a suitable indicator 120 to indicate the operational mode of the valve assembly.

Operation of the valve assembly will now be explained. As illustrated in FIGS. 1 and 2 of the drawings, valves 20 and 22 are closed so that conical surface 52 is seated on valve seat 28 and conical surface 76 is seated on valve seat 74. In this condition, of course, fluid flow between ports 16 and 18 is prevented, but fluid under pressure is present on the inlet side of valve assembly 12, that is, inlet port 16, in flow chamber 24, cross ports 38, cross port 44, flow chamber 46, and pressure chamber 59 through flow passage 48 and also in pressure chamber 95. Because of the pressurized fluid in chamber 59, pressure is exerted on conical surface 56 which exerts a force acting to close the main valve member by seating surface 52 on valve seat 28. Because of the presence of pressurized fluid in chamber 95, pressure is exerted on face 94 of piston member 92 which develops a force acting to move actuator stem 84 upwardly and open second valve 22 by lifting conical surface 76 from valve seat 74. The actuator mechanism 10 can thus function to control operation of the first and second valves with a minimum of force.

When it is desired to allow the movement of fluid across the valve assembly, actuating assembly 10 is activated driving actuator shaft 85 and stem 84 upwardly. Initial movement of stem 84 opens valve 22 by lifting conical surface 76 off of valve seat 74 allowing fluid to flow through the pressure reducing arrangement and outlet port 18. Movement of stem 84 and opening of valve 22 is facilitated by pressure acting on face 94 of piston 92, as noted above, and at the same time, pressure acting on conical surface 56 maintains main control valve 20 closed. As actuator stem 84 continues its upward movement, the jam nuts 86 engage the end wall of the sleeve 64 to cause movement of the main valve disc 40. In the alternative, the face of piston 92 may engage the stop shoulder on the sleeve 64 to transmit the actuating force to main valve disc 40. At this point, the main valve disc 40 moves upwardly opening main control valve 20 by lifting conical surface 52 off of valve seat 28. Fluid now flows through main valve 20. As soon as the main valve disc 40 starts to move upwardly, the flow through crossport 44 to the valve 22 starts to decrease because the cross-ports 44 move out of registry with cross-ports 38. When liner 54 engages the inner surface of bore 34, flow through the crossports 44 to the valve 22 is discontinued. With this arrangement the fluid flow is gradually transferred from the valve 22 to the valve 20.

Thus, it can be seen that proper sequential operation of the valves is assured due to the pressure tending to open second valve 22 and tending to close first valve 20. In addition, it can be seen that the force tending to open second valve 22 is opposed only by the force exerted by actuating mechanism 10 so that a high force is not required to open it. Also, when the jam nuts engage the end wall of the sleeve 64, the force acting to open the second valve is transmitted to main valve disc 40 partially offsetting the force acting to close first valve 20 and reducing the force required to open it. Because of the relationship between face 94 of piston 92 and surface 56, the resulting force acting on main valve disc 40 is relatively small and acts to keep first valve 20 closed preventing it from opening until stem 84 continues further movement. It can also be seen that the fluid flow is gradually transferred to valve 20 after it opens by reducing flow to the valve 22.

Figure 5:
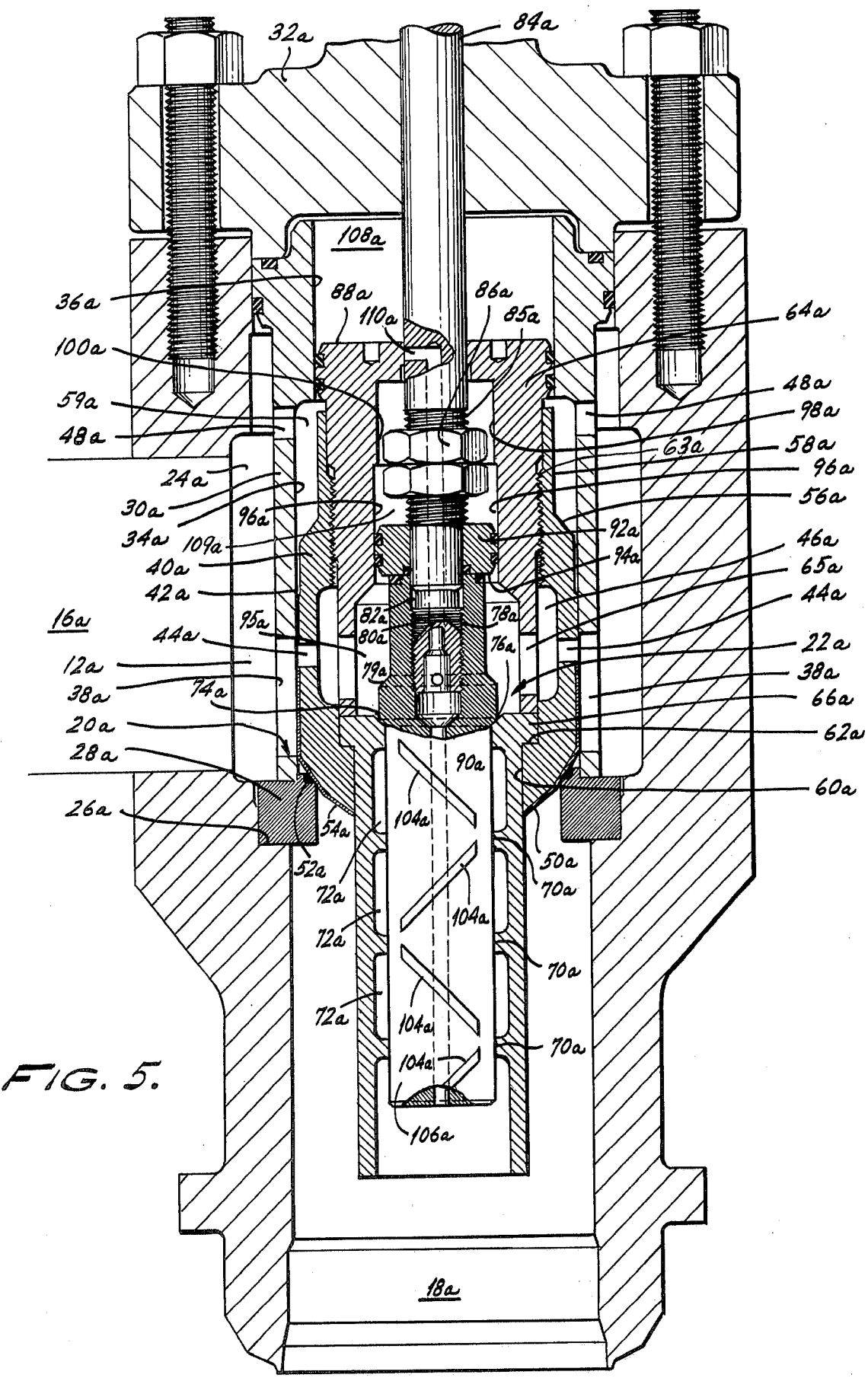
FIG. 5 is an enlarged section view of the valve portion of another embodiment of a valve assembly in accordance with this invention and illustrating the valves in closed positions, and, FIG. 6 is an enlarged section view of the valve portion illustrated in FIG. 5, but showing the valves in open positions.
Figure 6:
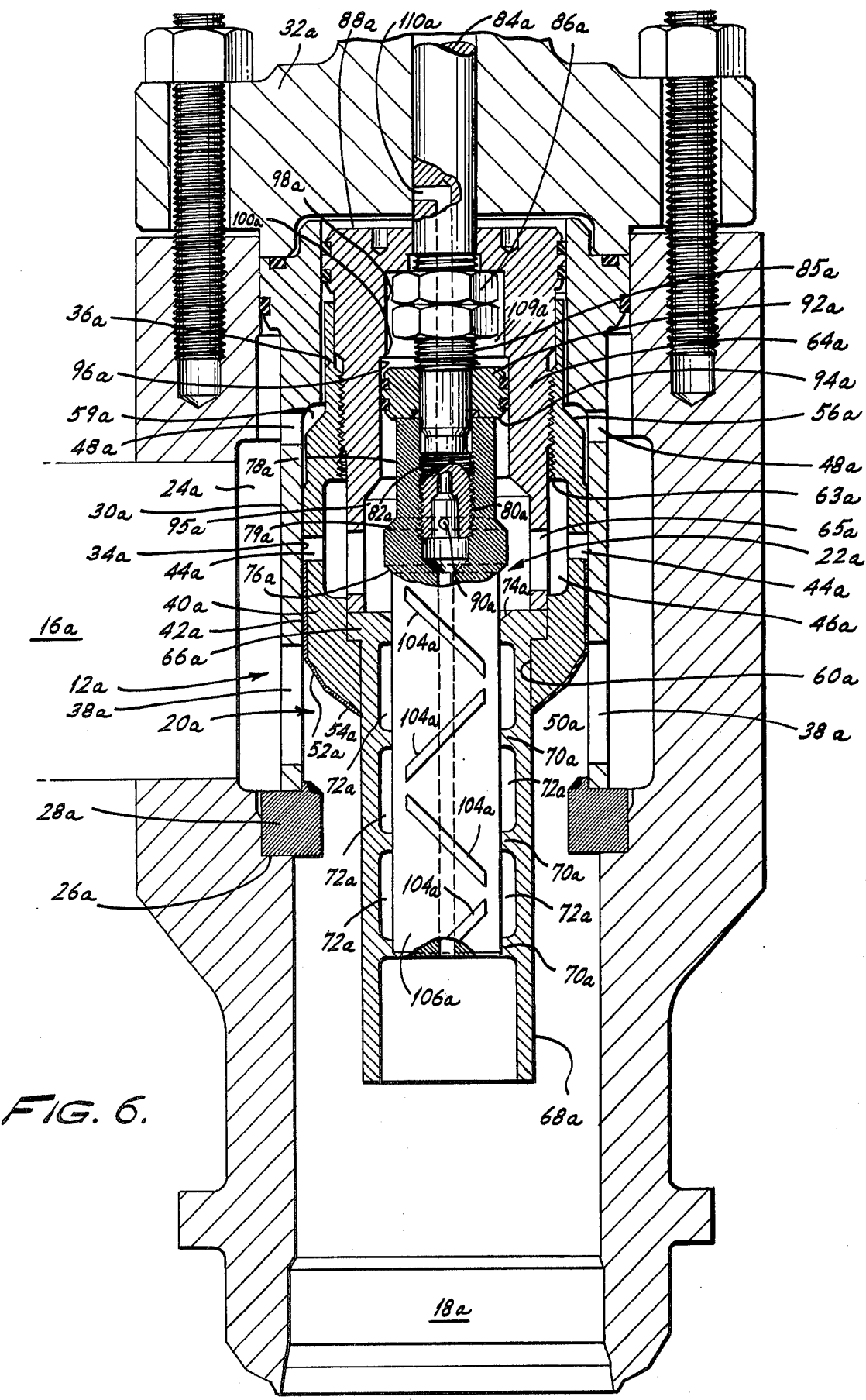

Referring now to FIGS. 5 and 6 of the drawing there is shown another preferred embodiment of a two-stage sequentially operated valve assembly in accordance with this invention. Since the embodiment shown in FIGS. 5 and 6 is generally similar to the embodiments shown in FIGS. 1 through 4, like reference numerals with the suffix a will be used in the following description when referring to like parts. As in the embodiment of FIGS. 1 through 4 of the drawing, the embodiment of FIGS. 5 and 6 include an actuating assembly, not shown, but which can be generally similar to actuating assembly 10 shown in FIG. 1 of the drawing. There is also a valve assembly 12a which is mounted in a generally cylindrical housing, not shown, but generally similar to housing 14 illustrated in FIG. 1 and formed with a radially disposed inlet port 16a and an axially disposed outlet port 18a. Between ports 16a and 18a are a first control valve 20a and a second control valve 22a each operatively connected to the actuating assembly for controlling the flow of fluid between the ports. Formed in the bore in housing 14a and radially adjacent inlet port 16a is an annular flow chamber 24a which extends about the upper end of outlet port 18a. At the juncture of outlet port 18a and flow chamber 24a is formed an annular shoulder 26a in which is located a valve seat 28a forming part of first control valve 20a and which is clamped in place by the lower end of a generally cylindrical guide sleeve 30a and a mounting bonnet 32a on which the actuator assembly is carried. The guide sleeve 30a is formed with a stepped bore including a large diameter bore 34a and a reduced diameter bore 36a. Spaced adjacent the lower end of guide sleeve 30a and above valve seat 28a are a series of cross ports 38a that communicate between flow chamber 24a and larger diameter bore 34a.

Slidably carried in the guide sleeve 30a is a main valve disc 40a having a generally outer cylindrical portion 42a formed with a series of cross ports 44a and an annular flow chamber 46a both of which communicate with cross ports 38a. Cross ports 44a having a relatively small diameter as compared to the cross ports 38a and are located in the direction axially of guide sleeve 30a, closely adjacent the periphery of cross-ports 38a spaced furtherest from valve seat 28a. That is, cross-ports 44a are closely adjacent the top of cross-ports 38a as viewed in the drawing. The diameter of cylindrical portion 42a is only slightly less than that of bore 34a and is covered with a liner 50a so that the cylindrical portion has a sliding and sealing fit with the bore. Extending from the lower end, as seen in the drawing, of cylindrical portion 42 are first and second frusto-conic surfaces 52a and 54a, respectively, and liner 50a also extends over these surfaces which cooperate with valve seat 28a to provide the first or main control valve 20a between ports 16a and 18a.

At the upper end of cylindrical portion 42a is formed another frusto-conic surface 56a which surface terminates at a cylindrical surface portion 58a having a diameter less than that of cylindrical portion 42a and slightly less than that of bore portion 36a in the guide sleeve 30a so that cylindrical surface portion 58a has a sliding fit in the latter. With this arrangement, a pressure chamber 59a is formed between cylindrical surface portion 58a and bore 34a of guide sleeve 30a which is in communication with inlet port 16a through flow passages 48a in the form of ports formed in guide sleeve 30a adjacent the top, as viewed in the drawing of annular chamber 24a. Thus, fluid pressure on the inlet side of valve assembly 12a acts on frusto-conic surface 56a developing a force acting to seat surface 52a on the valve seat 28a and keeping the first valve 20a closed.

Extending longitudinally through main valve disc 40a is a central stepped bore including a first reduced diameter bore 60a terminating in a shoulder 62a adjacent the bottom of flow chamber 46a. Above flow chamber 46a is an enlarged bore 63a which is internally threaded throughout a portion of its axial end and which cooperates with external threads formed on a guide sleeve 64a to secure the guide sleeve to the main valve disc. If desired, a set screw can be used to lock the guide sleeve to the main valve disc. Cross-ports 65a are formed at the lower end of guide sleeve 64a and communicate with inlet port 16a through flow chamber 46a, cross-ports 44a and 38a and flow chamber 24a.

Seated on shoulder 62a and clamped thereto by the lower end of guide sleeve 64a is a radial flange 66a formed on the upper end of a generally cylindrical sleeve member 68a extending downwardly through bore 60a in main valve disc 40a. The inner surface of sleeve member 68a is formed with a plurality of spaced land members 70a defining a plurality of fluid chambers 72a which will be further described hereinafter. At the upper end of the inner surface of sleeve member 68a is formed a valve seat 74a which cooperates with a conical surface 76a formed on the lower end of a cylindrical member 78a to provide second control valve 22a. When conical surface 76a seats on valve seat 74a, of course, fluid flow between ports 16a and 18a is prevented.

Formed through the upper end face of cylindrical member 78a is a threaded bore 80a which cooperates with an externally threaded portion 82a of an actuating stem 84a to couple the cylindrical member to the actuating stem. Actuating stem 84a extends through the end face 88a of guide sleeve 64a and is formed with another externally threaded portion 85a which cooperates with a limiting jam nut arrangement 86a for a purpose to be made clear. If desired, a locking pin 90a can be used to secure actuating stem 84a to cylindrical member 78a. Adjacent limiting jam nut arrangement 86a actuating stem 84a carries a piston member 92a, one face 94a of which seats on the end face of cylindrical member 78a. The piston member 92a is slidably engaged within the sleeve 64a and has a diameter equal to or less than the diameter of valve seat 74a. The diameter of cylindrical member 78a is less than that of piston member 92a to provide the face 94a. Adjacent the valve seat 76a the cylindrical member 78a is formed with an enlarged portion having a diameter approximately equal to the diameter of the piston member 92a and joined to the cylindrical portion by a tapered frusto-conic surface 79a. Both face 94a of the piston member 92a and frusto-conic surface 79a communicate with a pressure chamber 95a formed by the inner surface of guide sleeve 64a, cylindrical member 78a and valve 22a when closed. Thus, fluid pressure on the inlet side of valve assembly 12a acts on piston face 94a developing a force tending to open second valve 22a and also acts on frusto-conic surface 79a developing a force tending to close second valve 22a. Because of the equality of the diameter of piston face 94a and the enlarged portion of cylindrical member 78a these forces substantially balance each other so that when valve 22a is closed, fluid pressure does not exert any net opening or closing force on the second valve.

Piston member 92 is slidably received in an enlarged diameter portion 96a of sleeve member 64a which terminates in a further reduced diameter portion 98a forming a stop shoulder 100a. Normally, adjustable jam nut assembly 86a will engage the inner face of the upper end wall of sleeve 64a to limit movement of the stem 84a relative to the main valve disc 40a. Upward force acting on actuating stem 84a after upper wall adjustable jam nut assembly 86a engages the inner face of the sleeve 64a will be transmitted to main valve disc 40a and cause it to move as will be explained hereinafter.

As in the embodiment of the invention disclosed in FIGS. 1-4, the valve 22a formed by valve seat 74a and valve member 76a is adapted to operate at a high pressure differential and, accordingly, also includes a pressure reducing arrangement which can be of any suitable type, but which is disclosed as similar to that disclosed with respect to FIGS. 1-4. That is, the pressure-reducing arrangement includes a series of inclined throttling recesses 104a formed on a valve shaft 106a carried by valve member 76a and extending downwardly through sleeve member 68a. The throttling recesses 104a cooperate with chambers 72a formed between the lands 70a to reduce the fluid pressure until the fluid is discharged through the outlet port 18a.

As also seen in FIGS. 5 and 6 of the drawing, a chamber 108a is formed above end face 88a of guide sleeve 64a and the inner face of mounting bonnet 32a. This chamber 108a could be filled by pressurized fluid due to leakage in the valve assembly. To relieve the pressure, a suitable relief passage 110a is formed through actuator stem 84a, cylindrical member 78a and valve shaft 106a. Normally, the passage 110a is closed by the bore through the end wall 88a when the first and second valves are closed. As the second valve is open, passage 110a communicates with chamber 108a to relieve the pressure therein by allowing the fluid to be discharged. As with the embodiment of FIGS. 1-4, it is also noted that because of leakage, the chamber 109a formed between the top face of piston 92a and the lower face opposite face 88a of the guide sleeve 64a can accumulate fluid therein. As the valve 22a opens, the piston 92a which is moved upwardly by the actuating assembly forces accumulated fluid in chamber 109a to flow out through the same leakage path through which it entered the chamber and between actuating stem 84a and the end wall of guide sleeve 64a where it is also discharged through relief passage 110a. In a manner similar to that described with respect to the embodiment of FIGS. 1-4, the presence of leakage fluid in chamber 109a can provide a beneficial snubbing effect.

Operation of the valve assembly disclosed in FIGS. 5 and 6 of the drawing will now be explained. In FIG. 5 valves 20a and 22a are closed so that conical surface 52a is seated on valve seat 28a and conical surface 76a is seated on valve seat 74a. In this condition, of course, fluid flow between ports 16a and 18a is prevented, but fluid under pressure is present on the inlet side of valve assembly 12. Because of the pressurized fluid in chamber 59a, pressure is exerted on conical surface 56a which exerts a force acting to close the main valve member by seating surface 52a on valve seat 28a. Because of the presence of pressurized fluid in chamber 95a, pressure is exerted on face 94a of piston member 92a and on frusto-conic surface 79a which forces substantially balance each other so that no net opening or closing force is exerted on the second valve member by the fluid pressure. The actuator mechanism can thus function to control the operation of the first and second valves with a minimum of force required.

When it is desired to allow the movement of fluid across the valve assembly, stem 84a is moved upwardly as viewed in the drawings. Initial movement of stem 84a opens valve 22a by lifting conical surface 76a off of valve seat 74a allowing fluid to flow through the pressure reducing arrangement and outlet port 18a. Movement of stem 84a and opening of valve 22a is facilitated once the valve is open by the fluid pressure in chamber 95a acting on valve surface 76a. Thus, the net fluid pressure force acting on the valve assembly acts in the opening direction. This initial movement of valve stem 84a also opens passage 110a allowing fluid in chamber 108a to flow to outlet port 18a and therefore relieves any pressure on sleeve 64a which would resist opening of main valve disc 40a.

As actuator stem 84a continues its upward movement, jam nut assembly 86a engages the inner wall of the sleeve 64a to cause upward movement of main valve disc 40a away from valve seat 28a. Until this time, the fluid pressure in chamber 59a acts on surface 56a of main valve disc 40a and keeps the valve closed. After jam nut assembly 86a engages the inner wall the force exerted by actuator stem 84a is transferred to main valve disc 40a and lifts the main valve disc upwardly so that conical surface 52a no longer engages valve seat. Just after main valve 20a opens, cross-ports 44a move to a position adjacent the surface of bore 34a and when liner 50a engages the surface of the bore above the cross-ports 38a, the flow to chamber 95a is discontinued as is flow to second valve 22a. Thus the cross-ports 38a and the surface of bore 34a function as flow control means between inlet port 16a and second valve means 23a. which starts to discontinue flow through second valve 22a just after the main valve 20a opens and which gradually transfers all the fluid flow through the main valve.

When the flow across the valve assembly is to be discontinued, actuator stem 84a is moved downwardly until second valve surface 76a engages second valve seat 74a. Further downward movement of stem 84a causes main valve disc 40a to also move downwardly until main valve surface 52a engages main valve seat 28a. At this point both valves 20a and 22a are closed and flow across the valve assembly stops.

Thus, in the embodiment disclosed in FIGS. 5 and 6 of the drawing, similar to the embodiment of FIGS. 1-4, it can be seen that sequential operation of a two-stage valve is also assured because of fluid pressure force acting to maintain the main valve closed and that only minimal force is required to open the pressure reducing valve. It can also be seen that the fluid flow is transferred to the main control valve after it opens and flow to the pressure reducing valve is discontinued.

While in the foregoing there has been disclosed several preferred embodiments of a two-stage sequentially operated valve assembly in accordance with this invention, it should be obvious that various modifications and changes can be made without departing from the true spirit and scope of the invention as recited in the appended claims.

I claim:

1. A two-stage sequentially operated valve assembly comprising an inlet port and an outlet port, first and second valve means each controlling the flow of fluid from said inlet port to said outlet port, said first valve means including a surface portion in communication with said inlet port such that fluid pressure on the inlet side of said valve assembly acts to close said first valve means, said second valve means including a portion in slidable engagement with said first valve means, said portion having a surface in communication with said inlet port such that fluid pressure on the inlet side of said valve assembly acts only on said surface of said portion to provide a force acting to open said second valve means and whereby said force is not offset by any fluid pressure tending to close said second valve means, and actuating means operatively connected to both said first and second valve means for initially opening said second valve means and thereafter opening said first valve means, said actuating means providing a force retaining said second valve means in a closed position, a pressure chamber in communication with said inlet port for receiving fluid from the inlet side of said valve assembly, said first valve means including a valve disc member and a valve seat, said valve disc member having said surface portion formed on its outer periphery and being arranged with said surface portion in said pressure chamber whereby the fluid inlet pressure on said inlet side of said valve assembly can act to move said valve disc member into engagement with said valve seat.

2. A two-stage sequentially operated valve assembly in accordance with claim 1 wherein said actuating means includes a valve stem connected to said second valve means, said valve stem having a first position in which said second valve means is closed and a second position wherein said second valve means is open and said first valve means is closed, said actuating means further includes means for coupling said first and second valve means in said second position whereby said first valve means can be operated, said coupling means being also operative in said second position to transmit the force acting to open said second valve means to said first valve means for offsetting the fluid pressure acting to close said first valve means.

3. A two-stage sequentially operated valve assembly in accordance with claim 1 wherein flow control means is provided between said inlet port and said second valve means for allowing flow from said inlet port to said second valve means when said first valve means is closed and for discontinuing flow from said inlet port to said second valve means after said first valve means has opened whereby flow from said inlet port is transferred from said second valve means through said first valve means only.

4. A two-stage sequentially operated valve assembly in accordance with claim 1 wherein said first valve means includes a valve disc member and a valve seat and wherein said second valve means includes a valve member located within said valve disc member and a second valve seat also located within said valve disc member, said valve disc member being formed with port means adjacent said second valve means and in communication with said inlet port when said first valve means is closed and out of communication with said inlet port after said first valve means has opened whereby fluid from said inlet port can flow to said second valve means until said first valve means is opened and thereafter can flow to said first valve means only.

5. A two-stage sequentially operated valve assembly in accordance with claim 1 wherein said first and second valve means is opened, the fluid pressure acting to open said second valve means is transmitted to said first valve means.

6. A two-stage sequentially operated valve assembly in accordance with claim 1 wherein said first valve means is a main flow control valve and said second valve means includes pressure reducing valve means.

7. A two-stage sequentially operated valve assembly in accordance with claim 1 wherein said first valve means includes a main valve disc, one face of said valve disc cooperating with a valve seat in its closed position, said surface portion of said first valve means being an opposite face of said main valve disc.

8. A two-stage sequentially operated valve assembly in accordance with claim 1 wherein said portion of said second valve means is a piston member adjacent said second valve means.

9. A two-stage sequentially operated valve assembly in accordance with claim 1 wherein said first valve means includes a main valve disc one face of which cooperates with a valve seat to close said valve means, said surface portion of said first valve means comprising another face of said main valve disc, said second valve means including a valve member cooperating with a valve seat to close said second valve means and said portion of said second valve means comprising a piston bearing on a face of said valve member.

10. A two-stage sequentially operated valve assembly in accordance with claim 9 wherein said second valve means includes a pressure reducing valve arrangement.

11. A two-stage sequentially operated valve assembly in accordance with claim 1 wherein said actuating means includes a stem connected to said second valve means and a guide sleeve rigidly connected to said first valve means, said stem being slidably carried in said guide sleeve between a first position wherein said second valve means is closed and a second position wherein said second valve means is open.

12. A two-stage sequentially operated valve assembly in accordance with claim 11 including means in said second position for coupling said stem and said first valve means whereby further movement of said stem opens said first valve means.

13. A two-stage sequentially operated valve assembly comprising an inlet port and an outlet port, first and second valve means each controlling the flow of fluid from said inlet port to said outlet port, said first valve means being a main control valve and including a main valve disc one face of which cooperates with a first valve seat for controlling the flow of fluid through said ports, said second valve means including a second valve seat carried in said valve disc and a valve member cooperating with said second valve seat for controlling the flow of fluid through said ports, said main valve disc including another face in communication with said inlet port such that fluid pressure on the inlet side of said valve assembly acts to close said first valve means, said second valve means bearing on and being connected for movement with a piston member one face of which is in communication with said inlet port, said piston member being in slidable engagement with a bore in said main valve disc such that fluid pressure acts only on said one face thereof developing a force acting to open said second valve means and such that the net inlet pressure fluid forces do not act to close said second valve means, and actuating means for sequentially opening said first and second valve means, said actuating means including a stem connected to said piston member and said valve member, said actuating means being movable from a first position wherein said first and second valve means are closed to a second position wherein said second valve means is open, means for transmitting force to said valve disc when said actuating means is in said second position such that fluid pressure acting to open said second valve means is transmitted to said first valve means for offsetting the fluid pressure acting to close said first valve means and such that movement of said stem beyond said second position opens said first valve means, a pressure chamber in communication with said inlet port for receiving fluid from the inlet side of said valve assembly, said another face of said main valve disc being formed on the outer periphery thereof and being opposite to said one face thereof, said another face of said main valve disc being located in said pressure chamber whereby fluid pressure on the inlet side of said valve assembly acts on said another face of said main valve disc to retain said main valve disc in engagement with said first valve seat.

14. A two-stage sequentially operated valve assembly in accordance with claim 13 wherein said main valve disc includes flow control means between said inlet port and said second valve means for allowing the flow of fluid from said inlet port to said second valve means when said first valve means is closed and for discontinuing the flow of fluid from said inlet port to said second valve means after said first valve means has opened whereby the flow of fluid from said inlet port is transferred from said second valve means to said first valve means after said first valve means has opened.

15. A two-stage sequentially operated valve assembly in accordance with claim 13 wherein said main valve disc is formed with port means for communication between said inlet port and said second valve means when said first valve means is closed, said port means being movable to a position wherein communication between said inlet port and said second valve means is discontinued after said first valve means is opened whereby the flow of fluid from said inlet port is transferred from said second valve means to said first valve means after said first valve means has opened.

16. A two-stage sequentially operated valve assembly in accordance with claim 13 wherein said main valve disc is located for sliding movement in a bore and wherein the end of said main valve disc opposite said first valve seat and said bore form a chamber into which fluid can leak and resist opening of said first valve means, said stem being movable in said chamber and through said opposite end of said main valve disc, said stem further including passage means for communicating between said chamber and said outlet port whereby fluid in said chamber can be discharged.

17. A two-stage sequentially operated valve assembly in accordance with claim 16 wherein said passage means is closed when said second valve means is closed and is open when said second valve means is open.

18. A two-stage sequentially operated valve assembly comprising an inlet port and an outlet port, first and second valve means each controlling the flow of fluid from said inlet port to said outlet port, said first valve means including a surface portion in communication with said inlet port such that fluid pressure on the inlet side of said valve assembly acts to close said first valve means, said second valve means including a portion in slidable engagement with said first valve means, said portion having a surface in communication with said inlet port such that fluid pressure on the inlet side of said valve assembly acts only on said surface of said portion to provide a force acting to open said second valve means and whereby said force is not offset by any inlet fluid pressure tending to close said second valve means, and actuating means operatively connected to both said first and second valve means for intially opening said second valve means and thereafter opening said first valve means, said actuating means providing a force retaining said second valve means in a closed position, flow control means provided between said inlet port and said second valve means for allowing flow from said inlet port to said second valve means when said first valve means is closed and for discontinuing flow from said inlet port to said second valve means after said first valve means has opened whereby all of the flow from said inlet port is transferred from said second valve means through said first valve means only, said flow control means being operative to start reducing flow through said second valve means as said first valve means starts to open.

19. A two-stage sequentially operated valve assembly comprising an inlet port and an outlet port, first and second valve means each controlling the flow of fluid from said inlet port to said outlet port, said first valve means including a surface portion in communication with said inlet port such that fluid pressure on the inlet side of said valve assembly acts to close said first valve means, said second valve means including a portion in slidable engagement with said first valve means, said portion having a surface in communication with said inlet port such that fluid pressure on the inlet side of said valve assembly acts only on said surface of said portion to provide a force acting to open said second valve means and whereby said force is not offset by any inlet fluid pressure tending to close said second valve means, and actuating means operatively connected to both said first and second valve means for initially opening said second valve means and thereafter opening said first valve means, said actuating means providing a force retaining said second valve means in a closed position, said first valve means including a valve disc member and a valve seat and wherein said second valve means includes a valve member located within said valve disc member and a second valve seat also located within said valve disc member, said valve disc member being formed with port means adjacent said second valve means and in communication with said inlet port when said first valve means is closed and out of communication with said inlet port after said first valve means has opened whereby fluid from said inlet port can flow to said second valve means until said first valve means is opened and thereafter can flow to said first valve means only, said port means moving out of communication with said inlet port to start reducing flow through said second valve means as said first valve means starts to open.

20. A two-stage sequentially operated valve assembly comprising an inlet port and an outlet port, first and second valve means each controlling the flow of fluid from said inlet port to said outlet port, said first valve means being a main control valve and including a main valve disc one face of which cooperates with a first valve seat for controlling the flow of fluid through said ports, said second valve means including a second valve seat carried in said main valve disc and a valve member cooperating with said second valve seat for controlling the flow of fluid through said ports, said main valve disc including another face in communication with said inlet port such that fluid pressure on the inlet side of said valve assembly acts to close said first valve means, said second valve means bearing on and being connected for movement with a piston member one face of which is in communication with said inlet port, said piston member being in slidable engagement with a bore in said main valve disc such that fluid pressure acts only on said one face thereof developing a force acting to open said second valve means and such that the net inlet pressure fluid forces do not act to close said second valve means, and actuating means for sequentially opening said first and second valve means, said actuating means including a stem connected to said piston member and said valve member, said actuating means being movable from a first position wherein said first and second valve means are closed to a second position wherein said second valve means is open, means for transmitting force to said valve disc when said actuating means is in said second position such that fluid pressure acting to open said second valve means is transmitted to said first valve means for offsetting the fluid pressure acting to close said first valve means and such that movement of said stem beyond said second position opens said first valve means, said main valve disc including flow control means between said inlet port and said second valve means for allowing the flow of fluid from said inlet port to said second valve means when said first valve means is closed and for discontinuing the flow of fluid from said inlet port to said second valve means after said first valve means has opened whereby all of the flow of fluid from said inlet port is transferred from said second valve means to said first valve means after said first valve means has opened, said flow control means being operative to start discontinuing flow through said second valve means as said first valve means starts to open.

21. A two-stage sequentially operated valve assembly comprising an inlet port and an outlet port, first and second valve means each controlling the flow of fluid from said inlet port to said outlet port, said first valve means being a main control valve and including a main valve disc one face of which cooperates with a first valve seat for controlling the flow of fluid through said ports, said second valve means including a second valve seat carried in said main valve disc and a valve member cooperating with said second valve seat for controlling the flow of fluid through said ports, said main valve disc including another face in communication with said inlet port such that fluid pressure on the inlet side of said valve assembly acts to close said first valve means, said second valve means bearing on and being connected for movement with a piston member one face of which is in communication with said inlet port, said piston member being in slidable engagement with a bore in said main valve disc such that fluid pressure acts only on said one face thereof developing a force acting to open said second valve means and such that the net inlet pressure fluid forces do not act to close said second valve means and, actuating means for sequentially opening said first and second valve means, said actuating means including a stem connected to said piston member and said valve member, said actuating means being movable from a first position wherein said first and second valve means are closed to a second position wherein said second valve means is open, means for transmitting force to said valve disc when said actuating means is in said second position such that fluid pressure acting to open said second valve means is transmitted to said first valve means for offsetting the fluid pressure acting to close said first valve means and such that movement of said stem beyond said second position opens said first valve means, said main valve disc being formed with port means for communication between said inlet port and said second valve means when said first valve means is closed, said port means being movable to a position wherein communication between said inlet port and said second valve means is discontinued after said first valve means is opened whereby all of the flow of fluid from said inlet port is transferred from said second valve means to said first valve means after said first valve means has opened, said port means moving out of communication with said inlet port to start reducing flow through said second valve means as said first valve means starts to open.

22. A two-stage sequentially operated valve assembly comprising an inlet port and an outlet port, first and second valve means each controlling the flow of fluid from said inlet port to said outlet port, said first valve means being a main control valve and including a main valve disc one face of which cooperates with a first valve seat for controlling the flow of fluid through said ports, said second valve means including a second valve seat carried in said valve disc and a valve member cooperating with said second valve seat for controlling the flow of fluid through said ports, said main valve disc including another face in communication with said inlet port such that fluid pressure on the inlet side of said valve assembly acts to close said first valve means, said second valve means bearing on and being connected for movement with a piston member one face of which is in communication with said inlet port, said piston member being in slidable engagement with a bore in said main valve disc such that fluid pressure acts only on said one face thereof developing a force acting to open said second valve means and such that the net inlet pressure fluid forces do not act to close said second valve means, and actuating means for sequentially opening said first and second valve means, said actuating means including a stem connected to said piston member and said valve member, said actuating means being movable from a first position wherein said first and second valve means are closed to a second position wherein said second valve means is open, means for transmitting force to said valve disc when said actuating means is in said second position such that fluid pressure acting to open said second valve means is transmitted to said first valve means for offsetting the fluid pressure acting to close said first valve means and such that movement of said stem beyond said second position opens said first valve means, said main valve disc being located for sliding movement in a bore and wherein the end of said main valve disc opposite said first valve seat and said bore form a chamber into which fluid can leak and resist opening of said first valve means, said stem being movable in said chamber and through said opposite end of said main valve disc, said stem further including passage means for communicating between said chamber and said outlet port whereby fluid in said chamber can be discharged, said passage means being closed when said second valve means is closed and being open when said second valve means is open.

* * * * *

UNITED STATES PATENT AND TRADEMARK OFFICE
CERTIFICATE OF CORRECTION

PATENT NO. : 4,078,582

DATED : March 14, 1978

INVENTOR(S) : Heinz K. Hetz

It is certified that error appears in the above-identified patent and that said Letters Patent are hereby corrected as shown below:

Column 10, line 34, after "seat" insert --28a--.

Column 10, line 42, "23a" should be --22a--.

Signed and Sealed this

Twenty-second Day of August 1978

[SEAL]

Attest:

RUTH C. MASON
Attesting Officer

DONALD W. BANNER
Commissioner of Patents and Trademarks